United States Patent [19]

Collier

[11] Patent Number: 5,166,965
[45] Date of Patent: Nov. 24, 1992

[54] HIGH VOLTAGE DC SOURCE INCLUDING MAGNETIC FLUX POLE AND MULTIPLE STACKED AC TO DC CONVERTER STAGES WITH PLANAR COILS

[75] Inventor: John A. Collier, Guelph, Canada

[73] Assignee: Varian Associates, Inc., Palo Alto, Calif.

[21] Appl. No.: 683,646

[22] Filed: Apr. 11, 1991

[51] Int. Cl.[5] ............................................. H05G 1/06
[52] U.S. Cl. ..................... 378/101; 336/200; 336/232; 361/414; 363/61; 363/68; 378/104
[58] Field of Search ............ 363/59, 60, 61, 68; 378/101, 102, 104, 202; 336/232, 200; 361/414

[56] References Cited

U.S. PATENT DOCUMENTS

| | | | |
|---|---|---|---|
| 3,187,208 | 6/1965 | van de Graaff | 310/40 |
| 3,274,526 | 9/1966 | Emanuelson | 336/60 |
| 3,419,834 | 12/1968 | McKechnie et al. | 336/69 |
| 3,483,499 | 12/1969 | Lugten | 336/180 |
| 3,505,608 | 4/1970 | Enge | 328/233 |
| 3,568,035 | 3/1971 | Pierson . | |
| 3,611,032 | 10/1971 | Skillicorn . | |
| 3,781,639 | 12/1973 | Peschel . | |
| 3,833,872 | 9/1974 | Marcus et al. | 336/83 |
| 4,253,079 | 2/1981 | Brosh | 336/84 |
| 4,338,657 | 7/1982 | Lisin et al. | 363/68 |
| 4,418,421 | 11/1983 | Kitadate et al. | 378/102 |
| 4,559,590 | 12/1985 | Davidson | 363/21 |
| 4,587,606 | 5/1986 | Sanada | 363/68 |
| 4,777,406 | 10/1988 | Ross et al. | 315/3.5 |
| 4,807,105 | 2/1989 | Varjasi et al. | 363/68 |
| 4,937,729 | 6/1990 | Gadreau et al. | 363/134 |
| 4,977,491 | 12/1990 | Domenget et al. | 363/15 |

FOREIGN PATENT DOCUMENTS

| | | |
|---|---|---|
| 1580316 | 9/1969 | France . |
| 981390 | 8/1970 | France . |
| 60-245208A | 12/1985 | Japan . |
| 32362 | 2/1991 | Japan . |

OTHER PUBLICATIONS

Handbook of Rectifier Circuits, Scoles, G. J., Ellis Horwood Limited, Chichester, pp. 192-195.

Primary Examiner—William H. Beha, Jr.

[57] ABSTRACT

A high voltage high power DC source includes a magnetic flux pole structure responsive to a high frequency, relatively low voltage source inductively coupled to the pole. Multiple AC to DC converters inductively coupled to the pole are connected in series, stacked relationship with each other, to derive the high voltage, high power DC output. Each stage includes a pair of oppositely wound planar coils on opposite sides of a printed circuit board. The printed circuits of the different stages are displaced from each other and a coil driven by the high frequency source.

39 Claims, 4 Drawing Sheets

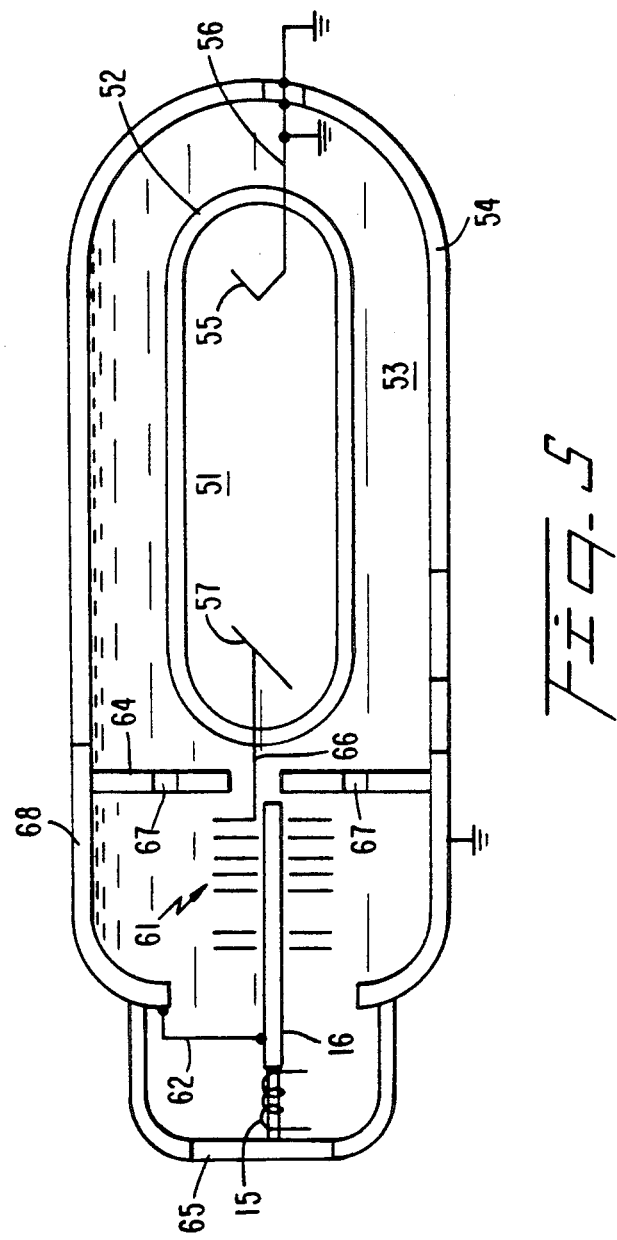

HIGH VOLTAGE DC SOURCE INCLUDING MAGNETIC FLUX POLE AND MULTIPLE STACKED AC TO DC CONVERTER STAGES WITH PLANAR COILS

FIELD OF INVENTION

The present invention relates generally to high voltage, high power DC sources and more particularly to such a source including a magnetic pole structure inductively excited by an AC source and plural stacked AC to DC converters, each including a planar coil surrounding the magnetic pole.

BACKGROUND ART

Generally, prior art high voltage, high power DC power supplies have employed transformers having a high primary to secondary turns ratio, wherein the transformer is excited by a relatively low frequency, low voltage AC source. High voltage AC developed across the transformer secondary winding is converted into DC. The AC excitation is limited to relatively low frequencies, typically less than 10 kHz, because the transformer high turns ratio causes parasitic impedances in the secondary winding circuit to be reflected to the primary winding by a factor equal to the square of the turns ratio. In consequence, the parasitic impedances in the transformer secondary circuit are reflected to the transformer primary circuit as significant impedances at relatively high frequencies, to limit the transformer bandwidth to 10 kHz or less. Hence, the excitation frequency of the transformer is so limited, resulting in components having relatively large volume, weight and cost.

The structure disclosed in my copending, commonly assigned application 07/450,183, filed Dec. 13, 1989, now U.S. Pat. No. 5,023,768 for High Voltage High Power DC Power Supply, to a large extent, obviates many of the problems associated with low frequency excitation. In my aforementioned application, a high voltage, high power DC power supply includes an elongated central primary winding, surrounded by plural AC to DC converter stages, having DC output voltages that are stacked together to derive the desired high voltage, high power output. Each stage includes a separate secondary winding inductively coupled to the primary winding at a different position along the primary winding. AC induced in the secondary winding of each stage is converted into DC by a rectifier circuit, that may include voltage doubler elements. The primary winding is excited by an AC source having a frequency in excess of 100 kHz, to provide supply components having relatively small volume, weight and cost. This prior art structure has a coaxial configuration, to assist in minimizing high voltage electric field stresses. It also has a relatively wide bandwidth and uniform grading along its length.

However, the prior art device is relatively long in length and preferably employs magnetic cores in each stage. The use of magnetic cores in each stage adds to the weight, volume and cost requirements of the prior art structure disclosed in the aforementioned application.

It is, accordingly, an object of the present invention to provide a new and improved high voltage, high power DC power supply that is relatively inexpensive, occupies relatively small volume and has relatively low weight.

Another object of the invention is to provide a new and improved high voltage, high power DC power supply excited by a relatively low voltage AC source having a frequency in excess of approximately 100 kHz, to enable components employed in the supply to have relatively low weight, volume and cost.

A further object of the present invention is to provide a new and improved relatively inexpensive high voltage, high power DC power supply having uniform grading and coaxial packaging, to provide high performance electrostatic stress characteristics.

A further object of the present invention is to provide a new and improved high voltage, high power DC power supply employing printed circuit windings in each of a plurality of stacked AC to DC converter stages.

Still a further object of the present invention is to provide a new and improved relatively inexpensive high voltage, high power DC power supply that is small enough to be inserted into the same housing as the housing for an envelope of a high power vacuum tube.

Yet another object of the invention is to provide a new and improved relatively inexpensive, relatively light weight DC power supply that can be inserted into an oil filled housing including an x-ray tube, in the volume previously occupied by a connector between an anode or cathode of the tube and a high voltage input terminal.

Yet another object of the invention is to provide a new and improved relatively inexpensive, relatively light weight DC power supply that can be inserted into an oil filled housing including an x-ray tube, in the volumes previously occupied by connectors between anode and cathode electrodes of the tube and a high voltage input terminal.

The Invention

In accordance with one aspect of the present invention a power supply for deriving a high voltage DC output in response to a source of AC having a low voltage comprises a structure forming an elongated magnetic flux pole having a longitudinal axis. A first coil surrounding the flux pole is adapted to be responsive to the source of for causing magnetic flux to flow along the flux pole longitudinal axis. Multiple AC to DC converter stages having DC output terminals are connected in stacked series relation with each other. Each of the converter stages includes a separate planar coil concentric with the flux pole and located in a plane at angles to the flux pole longitudinal axis. The first coil of each stage are at a different mutually exclusive non-overlapping longitudinal position along the flux pole axis and positioned so that the magnetic flux flowing longitudinally in the flux pole induces a voltage in the coil in a plane at right angles to the flux pole longitudinal axis.

Such an arrangement is well adapted for coaxial packaging of the magnetic circuit including the flux pole and the planar coil, to provide for optimum electrostatic stress and field conditions. In addition, such a configuration inherently has a wide bandwidth, capable of a flat response between 100 kHz and several mHz, to provide high frequency operation in response to an AC source of at least 100 kHz. Inherent with high frequency operation are components having relatively low volume, weight and cost. In addition, the aforementioned configuration has uniform grading and is adapted to provide a high output voltage over a short length. Reflected impedance problems associated with high turns ratio transformers are not present because of the stacked relationship. The planar coils enable the structure to have a short length, while providing a high voltage, high power output.

In the preferred embodiment, each of the planar coils is a printed circuit coil, and each of the converter stages preferably includes a pair of printed circuit coils on opposite sides of a common printed circuit board for the particular stage. The pair of coils of each stage surround the flux pole to enable coaxial packaging to be attained. The use of printed circuit coils is particularly advantageous with regard to a structure having a relatively short length and low cost.

The coils of a single stage are series connected with each other and oppositely wound on opposite sides of the printed circuit board associated with the stage. Such a configuration is highly advantageous because it obviates the need to provide connections between interior and exterior terminals of the coils. Connections to interior terminals of a printed circuit coil require a printed circuit lead to extend across the printed circuit coil, with possible deleterious results, even if the lead is on the back face of the printed circuit board carrying the coil. The possible deleterious results are more likely to occur if the coil is excited by a high frequency source. In addition, by oppositely winding the coils on opposite sides of the printed circuit board, the total AC voltage derived from the coil arrangement is twice the voltage obtained from a single coil, since the coils are oppositely wound in series aiding relationship.

To assist in minimizing size, the printed circuit board of each stage includes rectifier and filter means connected to the output terminals of the series connected coils of the particular stage. Preferably the rectifier and filter means of each stage are connected to form a voltage multiplier, to increase the DC output voltage associated with each stage.

The coils of each stage are preferably connected to each other by a plated through hole on the board associated with the stage. The plated through hole connects the interior terminals of the two windings of each stage together.

According to a further feature, components of the rectifier and filter means of each stage are positioned toward one side of the printed circuit board associated with the respective stage. The one sides of the printed circuit boards of adjacent stages carrying the components are differently directed so that the components of the rectifier and filter means of adjacent ones of the stages extend in non-interfering and non-overlapping relation with each other. The components of adjacent ones of the stages extend beyond portions of the printed circuits boards where the printed circuit coils are located. A quaternary of the printed circuit boards form a set of stacked AC-DC converters. The extending side of each member of each set is at right angles to the other extending sides of each member of that particular set. Thereby, the space for components on each printed circuit board is three times the height required for a particular stage.

Electric insulators having relatively high dielectric strength are sandwiched between the portions of the adjacent printed circuit boards where the printed circuit coils are located so that opposite faces of the insulators substantially abut against otherwise facing surfaces of portions of the adjacent printed circuit boards where the printed circuit coils are located.

Typically, the AC source is included as part of the power supply and supplies a frequency of at least 100 kHz to the first coil. The first coil is preferably a helical coil, to provide efficient coupling of the 100 kHz source to the flux pole. While a helical coil requires greater length along the flux pole than a planar coil, it does not suffer from skin effect and possible current crowding problems, which have a tendency to reduce efficiency of the relatively high current that the AC excitation source causes to flow in the first coil.

To assist in preventing current crowding in the planar coils, a low reluctance structure is provided for substantially preventing magnetic flux flowing out of the magnetic flux pole from traversing the planar coils. According to one embodiment, the magnetic flux is substantially prevented from flowing in the planar coils by providing first and second low magnetic reluctance elements that extend radially from the flux pole to a position outside of the planar coils. The first coil and planar coils are positioned between the low reluctance elements. To minimize costs, the first and second low magnetic reluctance elements are the only elements that substantially prevent the magnetic flux from traversing the planar coils. According to a second embodiment, the magnetic flux is also prevented from flowing through the planar coils by providing a low reluctance structure that extends axially of the flux pole longitudinal axis. This structure is more expensive than a structure only employing the first and second low magnetic reluctance elements, but is more effective and prevents induction heating of components close to the supply.

To minimize the possibility of breakdown between the flux pole structure and the coils, a solid dielectric is provided between the flux pole structure and the inner surfaces of the planar coils. The dielectric has a relatively high dielectric strength to prevent the breakdown.

In one application, the invention is used in combination with an electron tube having an envelope, an anode and a cathode located in the envelope. A terminal on a housing surrounding the envelope is adapted to be connected to the AC source. The power supply, including the flux pole structure, is located in the housing between the envelope and the housing so the flux pole extends between the envelope and the housing. The planar coil deriving the lowest voltage is located closer to the housing than any of the other planar coils, while the planar coil associated with the highest voltage stage is closer to the envelope than any of the other planar coils.

In one preferred embodiment, the electron tube is an x-ray mammogram tube having anode requirements of at least 40 kV and 2–10 kW. The power supply occupies a volume in the housing where a high voltage connector of a prior art x-ray tube assembly was located.

The power supply can be located in the same housing as a grounded cathode or grounded anode x-ray fluoroscopy tube or two such supplies can be located in the same housing as an x-ray tube having high voltage anode and cathode requirements, in which case one of the supplies energizes the cathode with a high negative voltage and the other supply energizes the anode with a high positive voltage.

It is, accordingly, a further object of the present invention to provide a new and improved x-ray tube housing wherein a high voltage power supply for an electrode of the x-ray tube is located in a housing for the x-ray tube envelope.

The above and still further objects, features and advantages of the present invention will become apparent upon consideration of the following detailed description of a specific embodiment thereof, especially when taken in conjunction with tee accompanying drawings.

BRIEF DESCRIPTION OF DRAWING

FIG. 5 is a side view of an x-ray tube housing including a high voltage supply in accordance with the present invention.

DESCRIPTION OF THE PREFERRED EMBODIMENT

Figure 1:
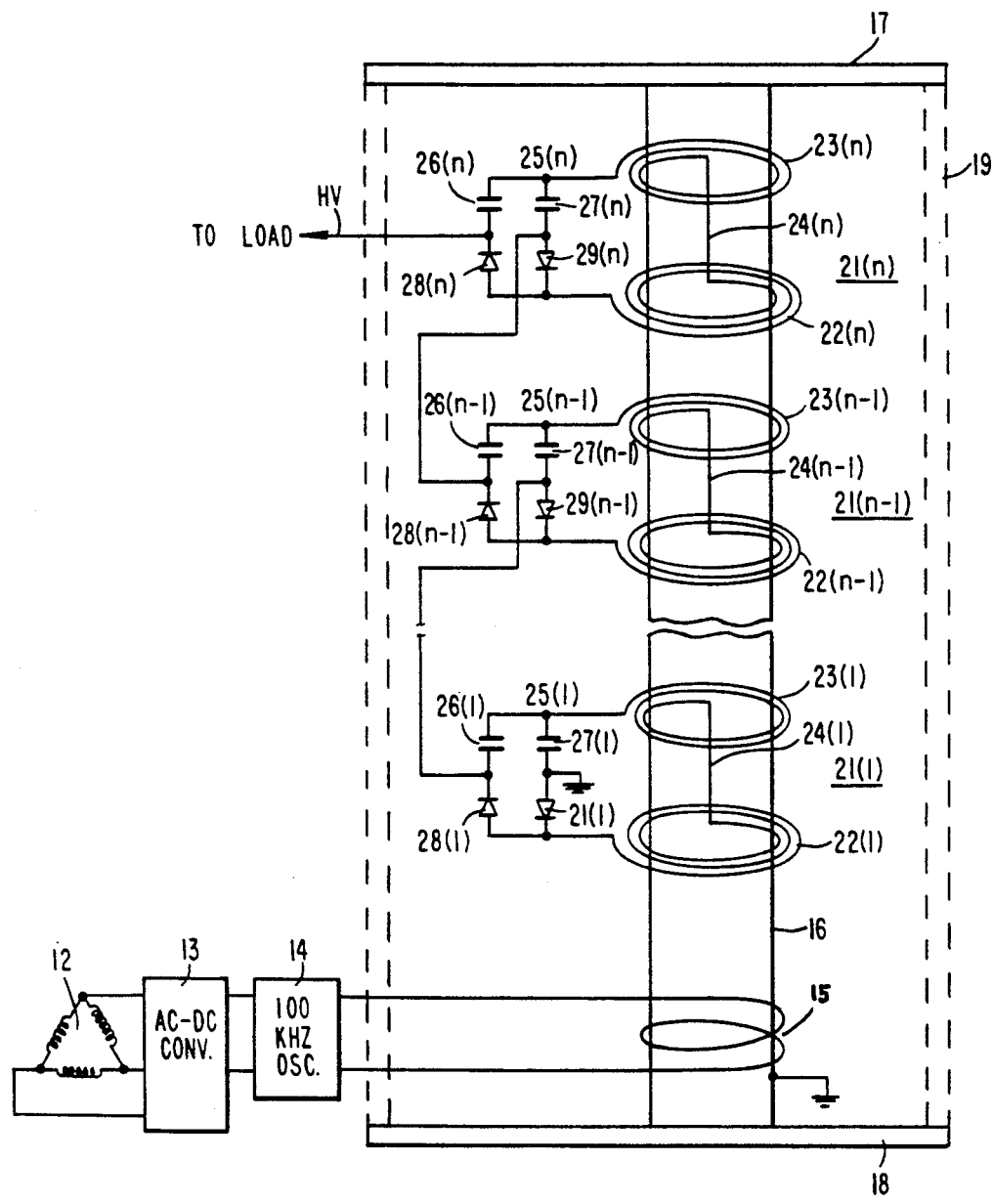
FIG. 1 is a schematic diagram of a preferred embodiment of the present invention.

Reference is now made to FIG. 1 of the drawing wherein power supply 11 is schematically illustrated as being excited by secondary three phase transformer 12 which drives rectifier 13 for deriving a high power DC output of several hundred volts DC. The output of rectifier 13 is supplied to oscillator 14, including semiconductor switching components. Oscillator 14 derives an AC output having a frequency of at least 100 kHz, a voltage of about 180 volts and a power of between 5 to 50 kilowatts. Oscillator 14 can also be energized by a single phase AC source driving a rectifier or by a battery.

The high frequency output of oscillator 14 is supplied to helical primary winding coil 15, wound about cylindrical, elongated, solid ferrite core 16, that forms a magnetic pole structure and is grounded, so no substantial voltage gradient exists between the winding and core. The AC current supplied by oscillator 14 to winding 15 causes a corresponding AC magnetic flux to flow longitudinally of core 16, i.e., in the direction of the core longitudinal axis. The magnetic flux induced in core 16 by winding 15 flows into and out of high magnetic permeability (e.g. iron or ferrite) circular pole pieces 17 and 18 at opposite ends of the core. Thereby, the magnetic flux of pole structure 16 flows radially through pole pieces 17 and 18, between the center and periphery thereof. The magnetic flux path between the edges of pole pieces 17 and 18 is completed either by a relatively high reluctance air path between the pole pieces or by cylindrical, high magnetic permeability cylinder 19 that extends between the pole pieces and is fixedly attached thereto so that the longitudinal axes of core 16 and cylinder 19 coincide. End plates 17 and 18 and cylinder 19 (if employed) are designed so that stray magnetic flux from core 16 does not flow through planar secondary winding coils (described infra) that are longitudinally spaced along the core. Cylinder 19 and plates 17, 18 prevent stray magnetic field (1) induction heating of nearby objects and (2) electron optic interference with the operation of adjacent components (e.g. x-ray tubes) and promote efficient operation of high power supplies. If the power supply is to be used with a relatively low power load, e.g. a load having 2-10 kW and 20-125 kV requirements, plates 17, 18 and cylinder 19 can be excluded.

At the frequency of oscillator 14, where skin effects in the planar secondary winding coils becomes an appreciable factor, it is important to prevent the magnetic flux flowing into and out of core 16 from interacting with the coils. This is because the magnetic flux has a tendency to cause current crowding in the coils, to further increase the skin effects of the conductors in the coils, which increases the impedance of the coils and thereby decreases the efficiency of the device. If cylinder 19 is employed, all of the flux flowing through core 16 also flows through the cylinder, if the cross-sectional area and the materials of the core and cylinder are selected so that they have the same reluctance. Such a configuration positively prevents the flow of magnetic flux in the planar windings. However, cylinder 19 is relatively heavy and expensive. Cylinder 19 can be eliminated if end plates 17 and 18 have sufficiently large diameters such that no appreciable magnetic flux flows from the tips thereof to the planar secondary winding coils located along the length of core 16.

Positioned at different locations along the longitudinal axis of core 16 are multiple AC to DC converter stages, illustrated as stages $21(1) \ldots 21(n-1), 21(n)$. In an actual device, each of stages 21 develops approximately a 4 kV DC output and 20 such stages are provided, such that n=20. Each of stages 21 has a length in the direction of the longitudinal axis of core 16 of about 0.163 inches so that a DC voltage of 80 kV is developed along a length of approximately $3\frac{1}{4}$ inches. The DC output voltages of stages 21 are series connected with each other, in stacked relationship.

AC-DC converter stage $21(n-1)$ is typical and is described. Stage $21(n-1)$ includes two planar oppositely wound secondary winding coils $22(n-1)$ and $23(n-1)$, printed on opposite faces of a printed circuit board, disposed at right angles to the longitudinal axis of core 16. The inner portions of coils $22(n-1)$ and $23(n-1)$ are connected together by a plated through hole in the printed circuit board for stage $21(n-1)$; the plated through hole is shown on FIG. 1 as lead $24(n-1)$. With an excitation flux of 100 kHz or more and a ferrite core 16 having a cross-sectional area of 1 square inch, voltages of 65 volts per turn can be feasibly induced in the windings of coils $22(n-1)$ and $23(n-1)$. Hence, relatively few turns are required on coils 22 and 23, which enables the planar configuration of the coils to be achieved. Actual experimentation with a planar winding indicates that the winding has a relatively flat response between 100 kHz and approximately 4.5 mHz. The response decreases on either side of this flat response region. Plates 17 and 18, cylinder 19 and planar coils $22(n-1)$, $23(n-1)$ have circular, symmetrical geometry coaxial with the longitudinal axis of core 16 to reduce electrostatic stress.

Coils $22(n-1)$ and $23(n-1)$ are employed in stage $21(n-1)$ because of the ease with which connections can be made to the exterior of the coils. Coils $22(n-1)$ and $23(n-1)$ are oppositely wound and connected in series aiding relations so that the AC voltages at the ends thereof are oppositely phased, i.e., when the voltage at the exterior end terminal of coil $22(n-1)$ is positive the voltage at the exterior end terminal of coil $23(n-1)$ is negative, and vice versa.

The voltages at the exterior, end terminals of coils $22(n-1)$ and $23(n-1)$ are connected to rectifier circuit 25(n−1), configured as a voltage doubler. Rectifier, i.e., voltage doubler, 25(n−1) includes capacitors 26(n−1) and 27(n−1), each having an electrode connected to the end terminal of coil 23(n−1), and 6 kilovolt power diodes 28(n−1) and 29(n−1). The anode of diode 28(n−1) is connected to the end terminal of coil 22(n−1), while the cathode of diode 29(n−1) is connected to this end terminal. The cathodes and anodes of diodes 28(n−1) and 29(n−1) are respectively connected to the electrodes of capacitors 26(n−1) and 27(n−1) that are not connected to the end terminal of coil 23(n−1). The common junction of diode and capacitor 27(n−1) is connected to an output terminal of stage 21(n−2) (not shown), while the common terminal for diode 28(n−1) and capacitor 26(n−1) is connected to an input terminal of stage 21(n), at a common terminal for diode 29(n−1) and capacitor 27(n−1). Typically, an AC voltage of approximately 1 kV, at 100 kHz, is induced by the magnetic flux in core 16 into each of coils 22(n−1) and 23(n−1). The 1 kV voltage induced in each of coils 22(n−1) and 23(n−1) is converted into about a 4 kV DC level by voltage multiplier (rectifier) 25(n−1). Rectifier 25(n−1) is constructed such that the DC voltage at the common terminal for diode 28(n−1) and capacitor 26(n−1) is positive with respect to the voltage at the common terminal for diode 29(n−1) and capacitor 27(n−1). If, however, it is desired to provide a negative DC power supply output voltage, the polarities of diodes 28(n−1) and 29(n−1) are merely reversed.

Each of stages 21(2)−21(n−2) is the same as stage 21(n−1). Stage 21(1) differs from stage 21(n−1) because in the former stage, the common connection between capacitor 27(1) and diode 29(1) is grounded. Stage 21(n) differs from stage 21(n−1) because the common connection for capacitor 26(n) and diode 28(n) is connected to a load driven by the supply.

To prevent possible high voltage breakdown between the various components, core 16 is covered by a dielectric sleeve or coating 33 (FIGS. 2-4) having a high breakdown strength, while dielectric boards, i.e., sheets 43 and 44 (FIG. 3), having a high dielectric breakdown strength, are provided on each of stages 21, below coil 22 and above coil 23. Sheets 43 and 44 can be replaced by high dielectric strength insulators having the same configuration as tube cake molds, i.e., bottom annular plates having inner and outer edges from which extend concentric side walls, coaxial with core 16. The side walls extend in generally the same direction as the axis of core 16, with slight outward tapers, to provide a long creep path between adjacent coils 22 and 23 of adjacent stages 21 (k) and 21 (k+1) to prevent breakdown between the coils. The side walls of these structures nest so they do not interfere with each other when stages 21 are stacked as described infra.

Figure 2:
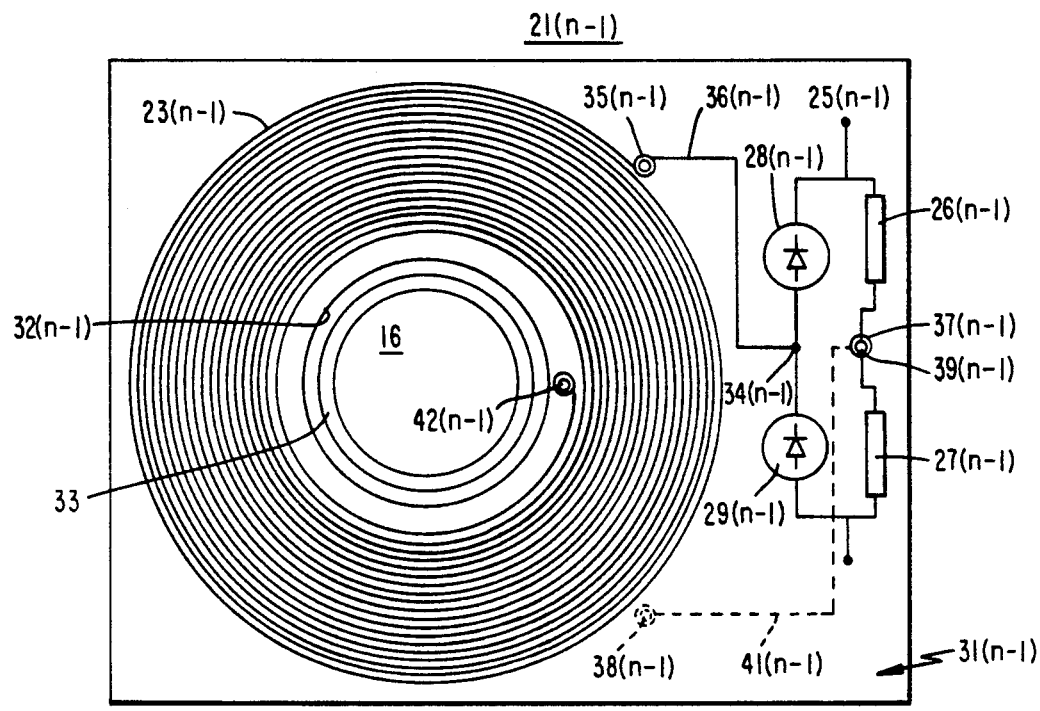
FIG. 2 is a top view of a printed circuit card including one stage of the circuit illustrated in FIG. 1.

Reference is now made to FIG. 2 of the drawing, a top view of printed circuit board 31(n−1) of stage 21(n−1) and the wires printed thereon, as well as the components of voltage multiplier 25(n−1) which are located on the upper face of the printed circuit board. Coil 23(n−1) is located on the center and left portion (as illustrated) of the upper illustrated face of dielectric printed circuit board 31(n−1). Winding 22(n−1), on the lower (not illustrated) face of board 31(n−1), is configured basically the same as winding 23(n−1) but is oppositely wound. Both of windings 22(n−1) and 23(n−1) are coaxial with core 16 that extends through circular hole 32(n−1) in board 31(n−1). Abutting against the exterior surface of core 16 is high dielectric strength electrical insulating sleeve or coating 33 that helps to prevent voltage breakdown from grounded core 16 to the high voltage parts on board 31(n−1) and is spaced slightly from the wall of hole 32(n−1). If there is a likelihood of a breakdown between an end face of core 16 and an adjacent structure at a high voltage derived from the power supply, the end face is also covered with a high dielectric strength electric insulator. All of the printed circuit boards are stacked so that the center of hole 32 of each of them is coaxial with the longitudinal axis of core 16.

Converter circuit 25(n−1) is mounted on the right side (as shown) of board 31(n−1). Common terminal 34(n−1) of diodes 28(n−1) and 29(n−1) is connected to exterior output terminal 35(n−1) of winding 23(n−1) by printed circuit lead 36(n−1). Common terminal 37(n−1) of capacitor 26(n−1) and 27(n−1) is connected to exterior terminal 38(n−1) of winding 22(n−2) by plated through hole 39(n−1) that extends to the lower face of printed circuit board 31(n−1). The end of plated through hole 39(n−1) on the lower face of printed circuit board 31(n−1) is connected to exterior end terminal 38(n−1) by printed circuit lead 41(n−1) that extends along the lower face of printed circuit board 31(n−1).

The interior terminals of windings or coils 22(n−1) and 23(n−1) are aligned at the same relative position on the upper and lower faces of board 31(n−1). Hence, interior terminal 42(n−1) of winding or coil 23(n−1) is aligned with a similar interior end terminal of coil 22(n−1). Interior end terminal 42(n−1) is connected to the corresponding interior end terminal of winding 22(n−1) by plated through hole 43(n−1) that extends through printed circuit board 31(n−1) between the interior terminals of the coils.

Capacitors 26(n−1) and 27(n−1) and diodes 28(n−1) and 29(n−1) are mounted in the usual manner on the upper face of printed circuit board 31(n−1). The components of voltage doubler 25(n−1) are mounted on board 31(n−1) so that the total height thereof above the upper face is appreciably less than 4/10 of an inch.

Figure 3:
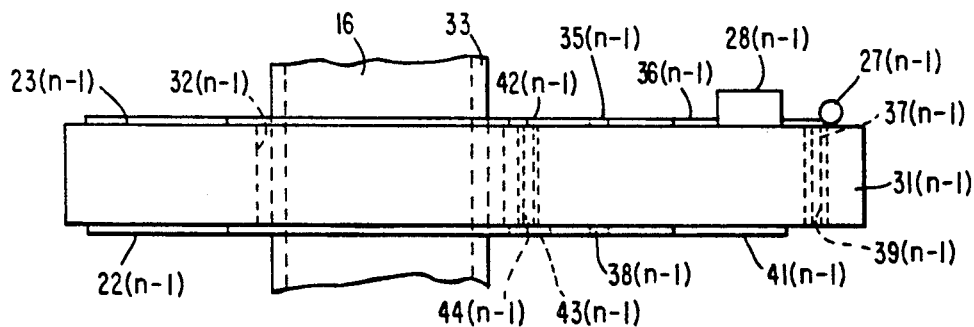
FIG. 3 is a side view of the printed circuit card and the components mounted thereon, as illustrated in FIG. 2.

As illustrated in FIG. 3, stage 21(n−1) includes annular dielectric sheets 43(n−1) and 44(n−1) respectively superposed over planar coils 22(n−1) and 23(n−1), against which the sheets abut. Sheets 43(n−1) and 44(n−1) are coaxial with the longitudinal axis of core 16 and have inner diameters equal approximately to the diameter of circular hole 23(n−1) and outer diameters that are slightly in excess of the diameter of coils 22(n−1) and 23(n−1) so that the insulating sheets completely cover their respective coils. The total height of stage 21(n−1) is approximately 0.163 inches, resulting from a thickness of 1/16 inch for printed circuit board 31(n−1) and a thickness of 50 mils for each of insulating sheets or boards 43(n−1) and 44(n−1). The thickness of the printed circuit wiring on board 31(n−1) can be considered as negligible.

Each of stages 21 is stacked on the stage adjacent thereto so that, for example, the lower face of sheet 43(n−1) abuts against the upper face of sheet 44(n−2). Despite this abutting relationship of insulating sheets 43 and 44 and a total thickness between adjacent printed circuit boards 31 of 100 mils, sufficient space is provided for the components of converters 25 on the various printed circuit boards 31 because the converter components are mounted to the side of each of the printed circuit boards and the printed circuit boards of abutting stages are turned such that the printed circuit boards in closest proximity to each other are turned 90° with respect to the axis of core 16, as illustrated in FIG. 4.

An assemblage of four adjacent AC to DC converter stages 21 is arranged so that the four protruding ends thereof on which the converter components are mounted are arranged at mutually orthogonal angles. Hence, in the stack illustrated in FIG. 4 stage 21(n), for example, is arranged so the components of converter 25(n) extend to the right (as illustrated) of the stack. The printed circuit board of stage 21(n−1) is arranged so the components of converter 25(n−1) extend to the rear of the stack. The components of converter 25(n−2) of stage 1(n−2) extend to the left of the stack, while the components of converter 25(n−3) of stage 21(n−3) extend to the front of the stack. The components of stage 21(n−4) are directly below and aligned with the components of stage 21(n). The space between the protruding portions of the printed circuit boards of stages 21(n) and 21(n−4) is such that there is sufficient room between the top of the components of stage 21(n−4) and the bottom face of the board of stage 21(n) to prevent contact between the components of stage 21(n−4) and the bottom face of the board of stage 21(n). The spacing is also sufficient to prevent discharge between the components of the converter of stage 21(n−4) and the printed circuit lead running along the bottom face of the printed circuit board of stage 21(n). If, however, there might be a discharge problem between the printed circuit lead on the bottom of the printed circuit board of stage 21(n) and the converter components of stage 21(n−4), insulating sheet 43(n) could be extended to the edge of the protruding part of the printed circuit board of stage 21(n). Discharge problems are further relieved by immersing the printed circuit boards of stages 21 and the portion of core 16 they surround in a high dielectric strength oil or other fluid.

The output terminal of converter 25(n−1) is connected to the input terminal of converter 25(n) by cable 45(n−1), while the output terminal of converter 25(n) is connected to the DC load by cable 45(n). Similarly, the input and output terminals of the remaining converters are connected to each other by cables 45(n−2) . . . 45(2), while the output terminal of converter 45(1) is connected to ground by cable 45(n).

Figure 4:
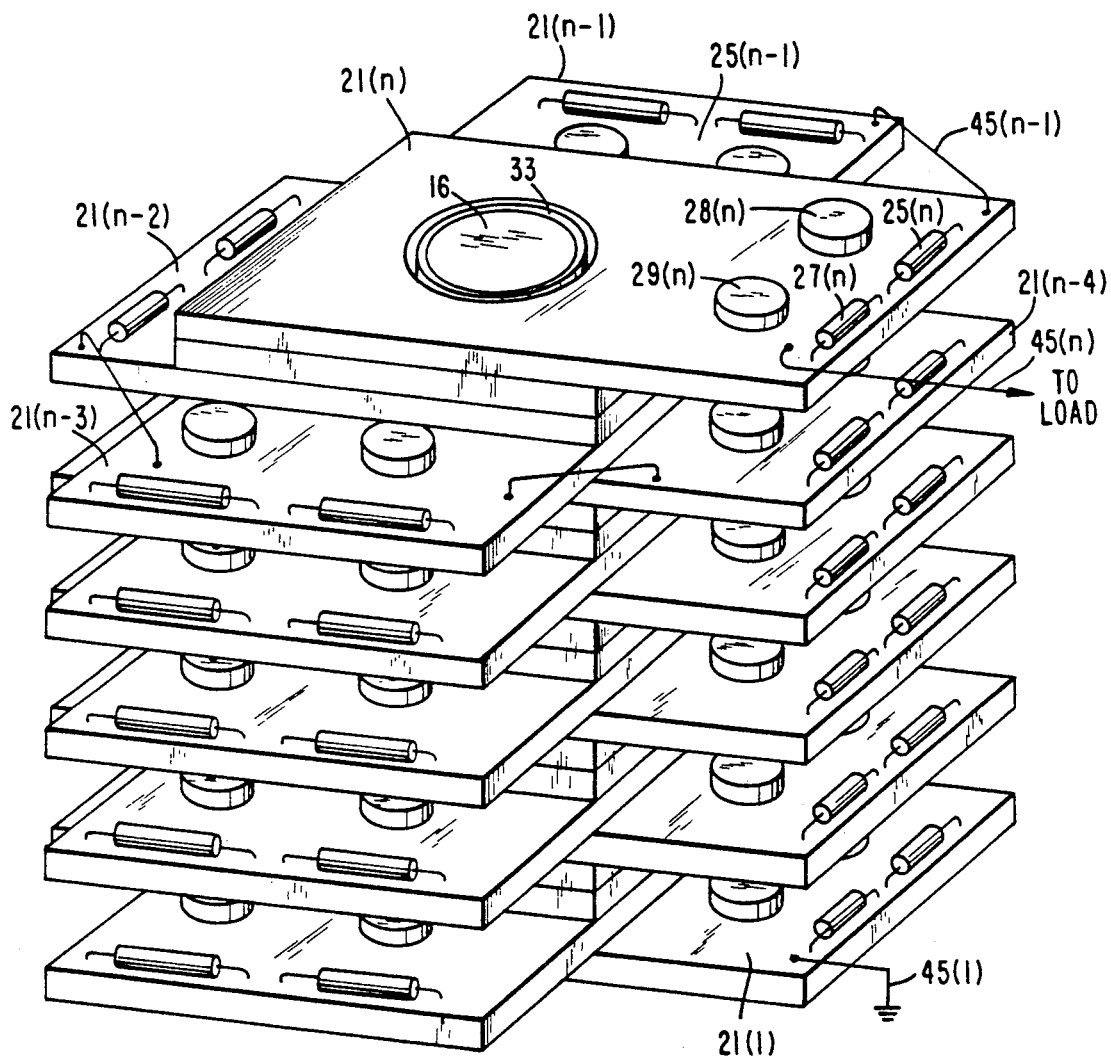
FIG. 4 is a perspective view of an assembly of stages of the type illustrated in FIGS. 2 and 3, to form a portion of the circuit schematically illustrated in FIG. 1.

If the structure illustrated in FIG. 4 is employed with a magnetic circuit including low reluctance end plates 17 and 18, the diameter of each end plate is somewhat greater than the diameter of coils 22 and 23, as described supra. If the structure of FIG. 4 is employed with a low reluctance magnetic circuit including end plates 17 and 18, in combination with cylinder 19, the protruding portions of printed circuit boards 31 (where the converter components are mounted) are curved so that the entire assembly illustrated in FIG. 4 approximates a cylinder that can fit snugly into cylinder 19.

The structure illustrated in FIGS. 2–4 has a coaxial magnetic geometry, having a longitudinal axis coincident with the axis of core 16 about which windings 22 and 23 are disposed. Thereby, electric field stress is controlled and minimized. Because core 16 and primary winding coil 15 are at approximately the same voltage (in the vicinity of ground), the coil can be tightly wound about the core to provide tight coupling between them and thereby provide high efficiency in transferring the magnetic flux of the coil to the core. Because the DC voltage is developed in many stages 21, a high turns ratio transformer is avoided, to enable the high voltage, high power supply of the present invention to have a high bandwidth, capable of responding to the at least 100 kHz output of oscillator 14. Thereby, the components of converters 25 of the various stages 21 have relatively small size, weight and cost. Because stages 21 are stacked together, control is provided of the voltage gradients from the several stages of the supply, i.e., the device is "self-grading." This construction also helps to achieve the high bandwidth and high frequency operation mentioned supra.

The structure illustrated in FIGS. 2–4 can be used in air if the gradient is less than approximately 10 volts per mil. However, in certain instances, the illustrated stack has a gradient of approximately 20 to 24 volts per mil, in which case it must be immersed in a fluid dielectric having a relatively high dielectric strength. The stack can be immersed in an oil bath or appropriate gas, e.g., $SF_6$ or high pressure air, if designed to provide an output voltage of 80 kilovolts over a length of approximately 3¼ inches. For high power applications oil is preferred because of its cooling benefits. The need for a dielectric fluid having a high breakdown strength can be obviated, even in a situation where the gradient is 24 volts per mil, by using the cake mold insulators for carrying the coils and by covering the coils with a solid, high breakdown strength dielectric coating.

One particular application of the present invention is as the high voltage, high power power supply for an x-ray tube. As described supra, the 75 or 80 kilovolt DC power requirements of high power x-ray tubes can be attained in a very small volume with the present invention. It is also possible to provide the excitation voltage for lower voltage x-ray tubes, such as tubes used to produce "soft" x-rays of the type used in mammography. In presently available mammography x-ray sources, a metal x-ray tube envelope is located in a metal filled housing oil bath. Typically, two inches are provided for a high voltage connector to extend between the housing wall and the x-ray tube envelope. A voltage on the order of 35 to 40 kilovolts is applied to the exterior of the housing, thence to the anode of the mammography x-ray tube through a connector extending through the oil bath in the housing for a distance of approximately two inches. With the present invention, it is possible to replace the connector with a stacked arrangement, as illustrated in FIG. 5 and by applying low voltage, high frequency AC energy to a coil located outside of the housing and coupled to the stack by a magnetic flux pole, similar to core or pole 16, FIGS. 1–3.

Reference is now made to FIG. 5 of the drawing, a partially schematic drawing of a mammography x-ray tube 51 included in metal envelope 52, located in dielectric oil bath 53, having a relatively high breakdown strength, in turn located in metal housing 54 including magnetic, e.g., iron, end portion 68. X-ray tube 51 includes grounded cathode 55, connected by lead 56 to grounded housing 54. Anode 57 of x-ray tube 51 is energized by a high voltage source of the type illustrated in FIGS. 1–4, to a voltage in the range of 35–40 kilovolts for the mammograph application.

Power supply 61 for energizing anode 57 is located in housing 54 in a region occupied in the prior art mammograph device by a 2″ long high voltage connector. The prior art high voltage connector includes a terminal that extends through the wall of housing 54 to a high voltage power supply terminal that is located outside of the housing. In accordance with one aspect of the present invention, the components for developing the high voltage to energize anode 57 are placed within housing 54 in the 2" long region between the end of envelope 51 proximate anode 57 and the adjacent end of housing 54 where the 2" long high voltage connector was previously located.

To these ends, ferrite core 16 extends through the end wall of housing 54, to which the core is electrically connected by lead 62. A portion of core 16 extends beyond housing 54 and has winding 15 wound thereon. As illustrated in FIG. 1, winding 15 is connected to the output of oscillator 14 having a frequency of at least 100 kHz. Located in housing 54 in close proximity to the portion of envelope 52 proximate anode 57 and iron disk 64 that extends radially of the longitudinal axis of housing 54 is a stack of AC to DC converter stages, of the type illustrated in FIGS. 2-4. The converter stages within housing 54 include printed circuit boards configured in the same manner as the printed circuit boards of FIGS. 2-4 so that windings of these printed circuit boards are concentric with core 16.

To complete the magnetic circuit for the magnetic flux induced in core 16 by current flowing in winding 15, the outer edges of radially extending plate 64 nearly abut against or contact the interior wall of iron housing portion 68. The magnetic circuit is completed by connecting magnetic cup 65 between iron portion 68 of housing 54 and the end of core 16. The magnetic field is thus confined so it does not leak into the region between anode 57 and cathode 55, whereby the magnetic field does not affect the x-ray tube electron optics.

The output terminal of the highest voltage stage of converter 61 is connected to anode 57 by lead 66 that extends through central aperture 69 in plate 64. Plate 64 also includes apertures 67 to enable oil in bath 53 to circulate from the remainder of the interior of housing 54 to the region where the stages of the high voltage supply 61 are located.

The side wall and end face of core 16 closest to plate 64, as well as the plate itself, are coated with a high dielectric strength electric insulator to prevent substantial arcing between the grounded core or the plate and neighboring high voltage components.

By configuring each stage of power supply 61 in the stack in housing 54 in the manner illustrated in FIGS. 2 and 3 so each stage develops 4 kilovolts and providing nine such stages, anode 57 is positively biased to a voltage of 36 kilovolts. The nine stages occupy a space of 1.74", leaving adequate room for plate 64, in the region previously occupied by the 2" connector. Hence, power supply 61 has a relatively low cost and the critical components thereof are of sufficiently small volume and weight to be located in housing 54. The cost of power supply 61 is also relatively low because of the repetitive nature of the different stages required to develop the total high voltage. Relatively expensive high voltage connectors are avoided, as are expensive cables and separate oil tanks for the high voltage power supply and the x-ray tube.

While the power supply is illustrated in FIG. 5 so that the axis of core 16 and the tube axis are substantially aligned, the core axis may be at right angles to the tube axis in situations where the power supply does not occupy the volume of a high voltage connector. In addition, the power supply voltage in the tube housing can be greater for higher energy applications; also, two power supplies, e.g., each at 62.5 kV, one for the anode and one for the cathode, can be incorporated in the tube housing.

While there has been described and illustrated one specific embodiment of the invention, it will be clear that variations in the details of the embodiment specifically illustrated and described may be made without departing from the true spirit and scope of the invention as defined in the appended claims. For example, plural power supplies of the type generally illustrated in FIG. 1, but without end plates 17, 18 and cylinder 19, can be located in a common metal container so the axes thereof are parallel. In such an instance, the stacked converter stages, as illustrated in FIG. 4, of each power supply are surrounded by a dielectric tube, having a high dielectric strength and an axis coaxial with the core of the particular power supply. The power supplies may be connected in series to maximize the output voltage between terminals of the supply. The container is filled with a high dielectric strength fluid to substantially prevent breakdown.

I claim:

1. A power supply for deriving a high voltage DC output in response to a source of AC having a lower voltage comprising a magnetic core structure forming an elongated magnetic flux pole having a longitudinal axis, a first coil surrounding said flux pole adapted to be responsive to said source of AC for causing magnetic flux to flow along the longitudinal axis of the flux pole, multiple AC to DC converter stages having DC output terminals connected in stacked series relation with each other, each of said converter stages including a separate planar coil concentric with said flux pole and located in a plane at right angles to the flux pole longitudinal axis, the fist coil and the coil of each stage being at different mutually exclusive, non-overlapping longitudinal positions along the flux pole and positioned so that the magnetic flux flowing longitudinally in the flux pole induces a voltage in the planar coils in planes at right angles to the axis.

2. The power supply of claim 1 wherein each of the planar coils is a printed circuit coil.

3. The power supply of claim 2 wherein each of the converter stages includes a pair of printed circuit coils on opposite sides of a common printed circuit board for the stage, the pair of coils of each stage surrounding the flux pole, each coil of each stage including approximately the same number of multiple turns.

4. The power supply of claim 3 wherein each coil of each stage includes plural turns and the coils of a single stage are series connected with each other and oppositely wound on opposite sides of the printed circuit board associated with the stage.

5. The power supply of claim 4 wherein each of the series connected coils of a single stage includes an output terminal on the exterior winding of the coil.

6. The power supply of claim 5 wherein the printed circuit board of each stage includes rectifier and filter means connected to the output terminals of the series connected coils of the particular stage.

7. The power supply of claim 6 wherein the rectifier and filter means of each stage are connected to form a voltage multiplier.

8. The power supply of claim 7 wherein the coils of each stage are connected to each other by a plated through hole on the board associated with the stage.

9. The power supply of claim 8 wherein components of the rectifier and filter means of each stage are positioned toward one side of the printed circuit board associated with the respective stage, said one sides of the printed circuit boards of adjacent stages being differently directed so that the components of the rectifier and filter means of adjacent ones of the stages extend in non-interfering and non-overlapping relation with each other and components of the adjacent printed circuit boards.

10. The power supply of claim 9 wherein the components of adjacent ones of the stages extend beyond portions of the printed circuit boards where the printed circuit coils are located.

11. The power supply of claim 9 wherein electric insulators are sandwiched between the portions of the adjacent printed circuit boards where the printed circuit coils are located so that opposite faces of the insulators substantially abut against otherwise facing surfaces of portions of the adjacent printed circuit boards where the printed circuit coils are located.

12. The power supply of claim 11 wherein a quaternary of said printed circuit boards form a set, the extending side of each member of each set being at right angles to the other extending sides of each member of that set.

13. The power supply of claim 12 wherein the AC source is included in the power supply and supplies a frequency of at least 100 kHz to the first coil.

14. The power supply of claim 13 wherein the first coil is a helical coil wound on and closely coupled to the flux pole magnetic core structure.

15. The power supply of claim 13 wherein the flux pole and first coil are at substantially the same voltage.

16. The power supply of claim 13 further including means for substantially preventing magnetic flux flowing out of the magnetic flux pole from traversing the planar coils.

17. The power supply of claim 16 wherein the means for substantially preventing includes first and second low magnetic reluctance end plates extending radially in all directions from the flux pole to a position outside of said planar coils, said first coil and planar coils being positioned between said first and second low reluctance end plates.

18. The power supply of claim 17 wherein said means for preventing consists of said end plates.

19. The power supply of claim 17 wherein said means for preventing further includes a low reluctance cylindrical structure extending axially of said longitudinal axis between said first and second low reluctance elements and enclosing said magnetic core structure and said coils.

20. The power supply of claim 16 wherein the flux pole structure and first coil are approximately at ground potential.

21. The power supply of claim 20 further including a solid dielectric between said flux pole structure and the inner surfaces of the coils, the dielectric having sufficient dielectric strength to prevent breakdown between the flux pole structure and the coils.

22. The power supply of claim 1 further in combination with an electron tube having an envelope, an anode and a cathode located in the envelope, a terminal on a housing surrounding the envelope adapted to be connected to the AC source, the power supply being located in the housing between the envelope and the terminal on the envelope so the flux pole extends between the envelope and the housing, the planar coil of the lowest voltage stage being located closer to the terminal on the envelope than any of the other planar coils, the planar coil associated with the highest voltage stage being closer to the envelope than any of the other planar coils.

23. The power supply of claim 22 wherein the electron tube is an x-ray tube having an anode requirement of at least 40 kV, the power supply occupying a volume in the housing where a high voltage connector of a prior art x-ray tube assembly was previously located.

24. The power supply of claim 1 wherein each stage includes a printed circuit board carrying the planar coil of the respective stage.

25. The power supply of claim 24 wherein components of the rectifier and filter means of each stage are positioned toward one side of the printed circuit board associated with the respective stage, said one sides of the printed circuit boards of adjacent stages being differently directed so that the components of the rectifier and filter means of adjacent ones of the stages extend in non-interfering and non-overlapping relation with each other and components of the adjacent printed circuit boards.

26. The power supply of claim 25 wherein the components of adjacent ones of the stages extend beyond portions of the printed circuit boards where the printed circuit coils are located.

27. The power supply of claim 24 wherein electric insulators are sandwiched between the portions of the adjacent printed circuit boards wherein the printed circuit coils are located so that opposite faces of the insulators substantially abut against otherwise facing surfaces of portions of the adjacent printed circuit boards wherein the printed circuit coils are located.

28. The power supply of claim 27 wherein a quaternary of said printed circuit boards form a set, the extending side of each member of each set being at right angles to the other extending sides of each member of that set.

29. The power supply of claim 25 wherein a quaternary of said printed circuit boards form a set, the extending side of each member of each set being at right angles to the other extending sides of each member of that set.

30. The power supply of claim 29 wherein the AC source is included in the power supply and supplies a frequency of at least 100 kHz to the first coil.

31. The power supply of claim 1 wherein the AC source is included in the power supply and supplies a frequency of at least 100 kHz to the first coil.

32. The power supply of claim 31 wherein the flux pole and first coil are at substantially the same voltage.

33. The power supply of claim 1 further including means for substantially preventing magnetic flux flowing out of the magnetic flux pole from traversing the planar coils.

34. The power supply of claim 33 wherein the means for substantially preventing includes first and second low magnetic reluctance end plates extending radially in all directions from the flux pole to a position outside of said planar coils, said first coil and planar coils being positioned between said first and second low reluctance end plates.

35. The power supply of claim 34 wherein said means for preventing consists of said end plates.

36. The power supply of claim 34 wherein said means for preventing further includes a low reluctance cylindrical structure extending axially of said longitudinal axis between said first and second low reluctance end plates and enclosing said magnetic core structure and said coils.

37. The power supply of claim 1 further including a solid dielectric between said flux pole structure and the inner surfaces of the coils, the dielectric having sufficient dielectric strength to prevent breakdown between the flux pole structure and the coils.

38. A power supply for deriving a high voltage DC output in response to a source of AC having a lower voltage comprising a structure forming an elongated magnetic flux pole having a longitudinal axis, a first coil surrounding said flux pole adapted to be responsive to said source of AC for causing magnetic flux to flow along the longitudinal axis of the flux pole, multiple AC to DC converter stages having DC output terminals connected in stacked series relation with each other, each of said converter stages including a separate planar coil concentric with said flux pole and located in a plane at right angles to the flux pole longitudinal axis, the coil of each stage being at a different longitudinal position along the flux pole and positioned so that the magnetic flux flowing longitudinally in the flux pole induces a voltage in the planar coils in planes at right angles to the axis, the flux pole structure and first coil being approximately at ground potential.

39. The power supply of claim 38 wherein the first coil and the coil of each stage are at different mutually exclusive, non-overlapping longitudinal positions along the flux pole.

* * * * *